(12) United States Patent
Ricken et al.

(10) Patent No.: US 8,931,354 B2
(45) Date of Patent: Jan. 13, 2015

(54) CORIOLIS MASS FLOW METER WITH HIGH ZERO STABILITY

(71) Applicant: Rota Yokogawa GmbH & Co. KG, Wehr (DE)

(72) Inventors: Martin Ricken, Bad Saeckingen (DE); Matthias Amann, Grafenhausen (DE); Peter Reinshaus, Kuessaberg (DE)

(73) Assignee: Rota Yokogawa GmbH & Co. KG, Wehr (DE)

( * ) Notice: Subject to any disclaimer, the term of this patent is extended or adjusted under 35 U.S.C. 154(b) by 106 days.

(21) Appl. No.: 13/867,350

(22) Filed: Apr. 22, 2013

(65) Prior Publication Data

US 2013/0283932 A1  Oct. 31, 2013

(30) Foreign Application Priority Data

Apr. 26, 2012  (EP) .................................... 12002936

(51) Int. Cl.
   *G01F 1/84*  (2006.01)
   *G01F 15/14*  (2006.01)

(52) U.S. Cl.
   CPC ............... *G01F 1/84* (2013.01); *G01F 1/8409* (2013.01); *G01F 1/8413* (2013.01); *G01F 1/8477* (2013.01); *G01F 15/14* (2013.01)
   USPC .................................................. 73/861.355

(58) Field of Classification Search
   None
   See application file for complete search history.

(56) References Cited

U.S. PATENT DOCUMENTS

| | | | |
|---|---|---|---|
| 4,738,144 A | 4/1988 | Cage | |
| 5,394,758 A | 3/1995 | Wenger et al. | |
| 6,308,580 B1 * | 10/2001 | Crisfield et al. | 73/861.355 |
| 6,776,052 B2 * | 8/2004 | Crisfield et al. | 73/861.354 |
| 2009/0266177 A1 | 10/2009 | Hussain et al. | |
| 2011/0000315 A1 * | 1/2011 | Tsubota et al. | 73/861.357 |
| 2011/0000316 A1 * | 1/2011 | Shimizu et al. | 73/861.357 |
| 2011/0023626 A1 * | 2/2011 | Weinstein | 73/861.357 |
| 2011/0197681 A1 | 8/2011 | Rieder et al. | |
| 2011/0209561 A1 * | 9/2011 | Hussain et al. | 73/861.357 |
| 2013/0319134 A1 * | 12/2013 | Chatzikonstantinou | 73/861.355 |

FOREIGN PATENT DOCUMENTS

| | | |
|---|---|---|
| DE | 10 2005 059 070 | 6/2007 |
| DE | 10 2005 062 007 | 6/2007 |
| DE | 10 2006 013 601 | 9/2007 |
| EP | 0 601 256 | 6/1994 |
| EP | 1 248 084 | 10/2002 |
| EP | 1 271 111 | 1/2003 |

(Continued)

OTHER PUBLICATIONS

Extended European Search Report dated Feb. 5, 2013 in European Application No. 12002936.8 with English translation of the relevant parts.

*Primary Examiner* — Harshad R Patel
(74) *Attorney, Agent, or Firm* — Collard & Roe, P.C.

(57) ABSTRACT

The invention relates to a Coriolis mass flow meter with improved zero point stability. The Coriolis mass flow meter has a pair of U-shaped measuring tubes. According to one embodiment of the invention, the Coriolis mass flow meter comprises a special housing for vibration compensation or vibration suppression in the region of the process connectors. Additionally or alternatively, a specific mass distribution of the vibration exciter and/or vibration sensor is provided, in order to neutralize unwanted vibrations by actively causing vibration.

1 Claim, 8 Drawing Sheets

(56) References Cited

FOREIGN PATENT DOCUMENTS

| EP | 1 166 051 | 7/2004 |
| EP | 1 985 975 | 10/2008 |
| WO | WO 2009/050133 | 4/2009 |
| WO | WO 2010/138111 | 12/2010 |

* cited by examiner

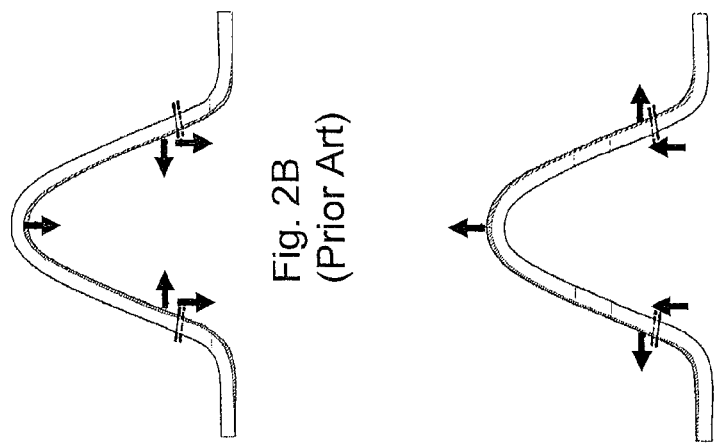
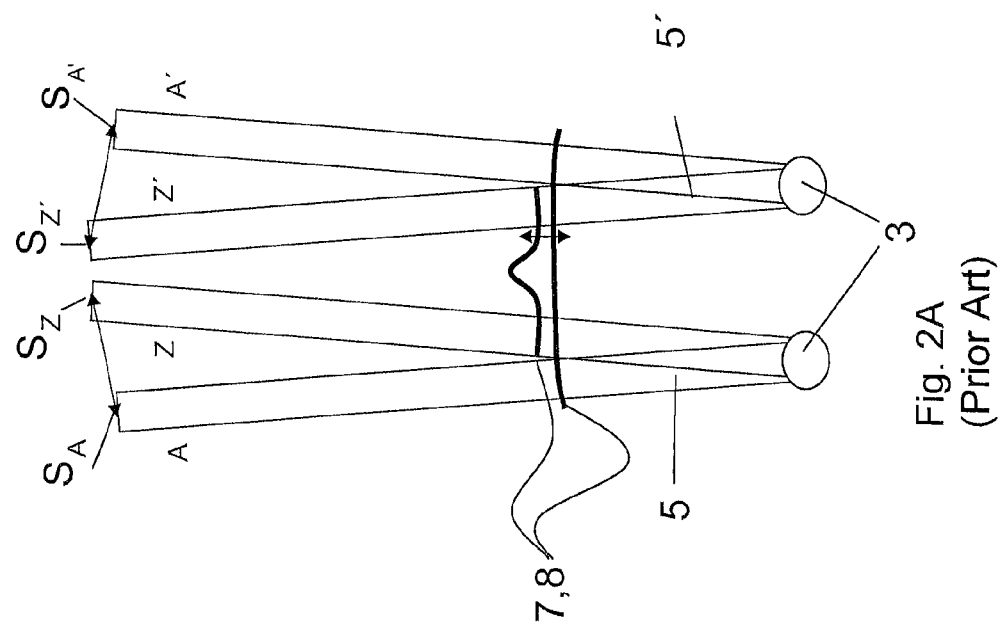

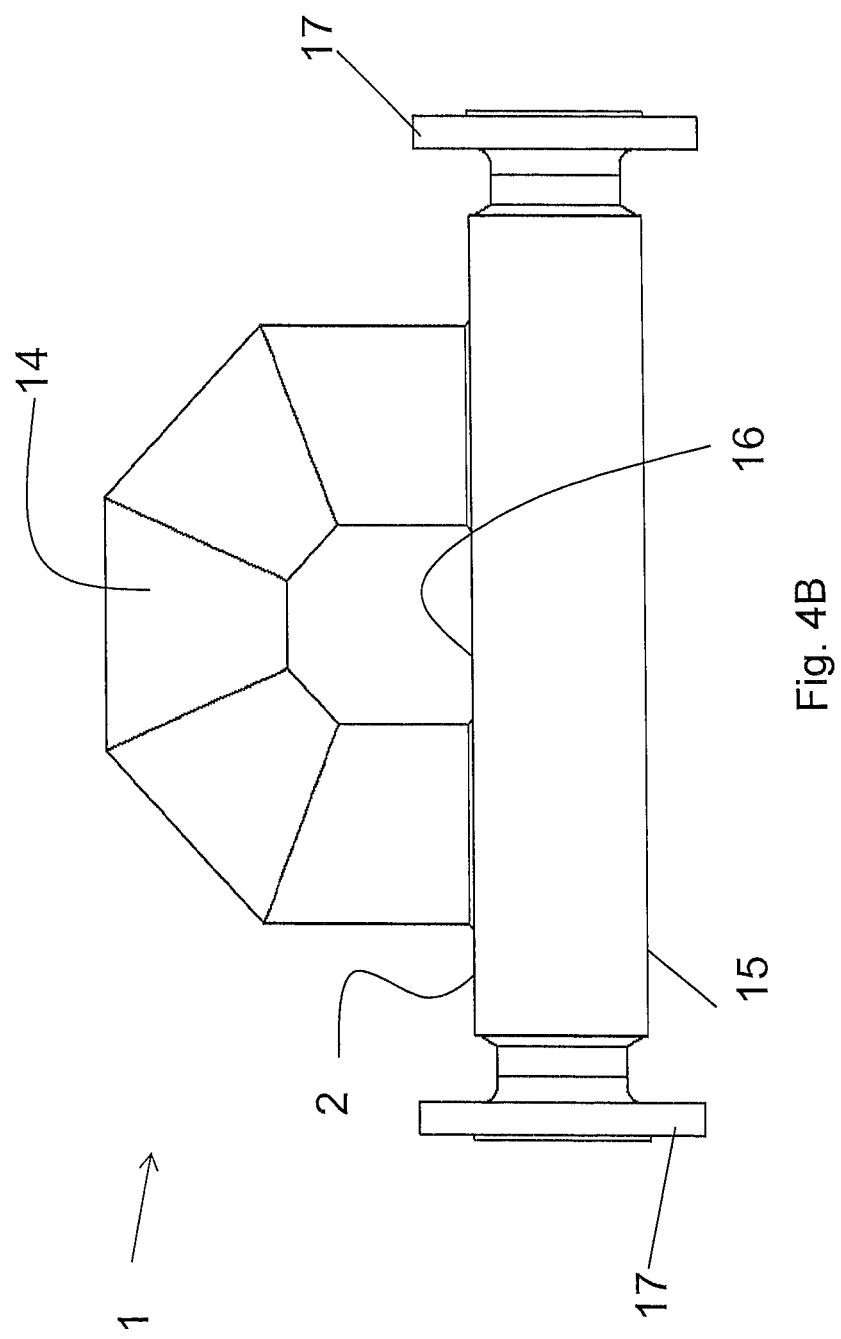

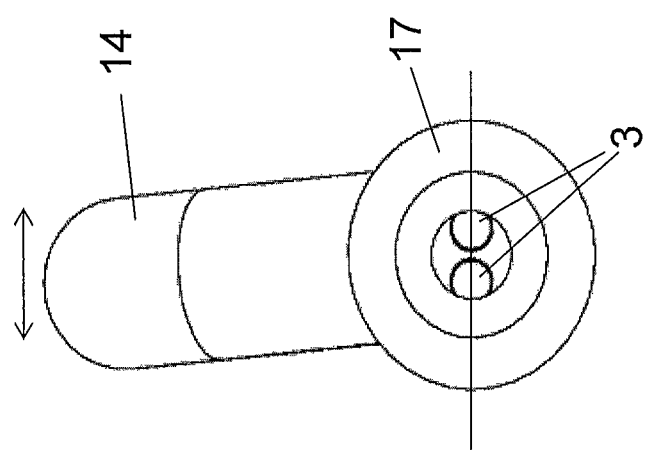

CORIOLIS MASS FLOW METER WITH HIGH ZERO STABILITY

CROSS REFERENCE TO RELATED APPLICATIONS

Applicant claims priority under 35 U.S.C. §119 of European Application No. 12002936.8 filed on Apr. 26, 2012, the disclosure of which is incorporated by reference.

BACKGROUND OF THE INVENTION

1. Field of the Invention

The invention relates to a Coriolis mass flow meter. More particularly, it relates to a Coriolis mass flow meter comprising a pair of counter-oscillating U-shaped measuring tubes.

2. Prior Art

FIGS. 1A, 1B, 2A, 2B, and 2C show a Coriolis mass flow meter according to the prior art. FIG. 1A is a perspective view, and FIG. 1B is a diagrammatic side view. The Coriolis mass flow meter 1 comprises a housing or a metallic frame 12, at the ends of which an inlet 3 and an outlet 4 for a fluid medium are located. In the vicinity of the inlet 3 and the outlet 4 there are located process connectors 13 for the purpose of incorporating the meter 1 in a process line. Between the inlet 3 and the outlet 4 there is situated a pair of U-shaped measuring tubes 5, each of which is capable of transporting a fluid medium. To ensure that both measuring tubes 5 will transport fluid, a stream-splitting device 11 is provided in the present case in the vicinity of each of the inlet 3 and the outlet 4. Both of the measuring tubes 5 have a central arch 6 and a region nearer to the end of the U-shaped portion, by means of which the two U-shaped measuring tubes are connected to the inlet 3 or the outlet 4. In the latter region there are provided in each case two joint plates 7, 7' and 8, 8', which determine the positions of the two U-shaped measuring tubes in relation to each other. The flow axis for the medium is designated by d.

For the purpose of measuring a mass flow by means of the Coriolis mass flow meter 1, the two measuring tubes 5 are caused to oscillate in opposite directions by means of a vibration exciter 9. The two U-shaped measuring tubes then move periodically away from each other and back towards each other. The oscillatory movements of the measuring tubes 5 are then detected by the two vibration sensors 10 and 10'. If no fluid flows through the Coriolis mass flow meter 1, the movements of the measuring tubes 5 detected by the two vibration sensors 10 and 10' respectively are in phase with each other. When, on the other hand, a fluid medium is flowing through the measuring tubes 5, the medium flowing therethrough will then experience, on account of the oscillatory movement of the measuring tubes 5, a Coriolis force that is differently vectored in the region of the respective vibration sensors 10 and 10' respectively. For this reason, a phase shift occurs between the signals detected by means of the vibration sensor 10 and 10' respectively. The measured phase angle is directly proportional to the mass flow. The modulus of elasticity of the measuring tube material is temperature-dependent and is likewise included in the proportionality constant between phase angle and mass flow. For this reason, the temperature of the measuring tubes 5 is measured and the phase angle adapted accordingly. With the aid of suitable signal processing techniques, a usable signal is formed from the measured signals, and this provides information on the desired mass flow.

The prior Coriolis mass flow meters are also used for media of low density (e.g. gases) or for media of very high viscosity, that is to say, for media involving a very low mass flow. Besides, the detected phase angle is generally rather small. Thus to ensure that even small mass flows can be measured precisely, a high zero point stability of the Coriolis mass flow meter is required. This is generally achieved by arranging for the Coriolis mass flow meters to be as free of vibration as possible in the region of the process connectors so that no vibrational energy can propagate into the adjoining process line. If the forces generated by the vibrating measuring tubes in the joint plates are not completely compensated for, the meter will then vibrate as a whole so as to excite the adjoining process line, so that feedbacks will occur and the zero point will become unstable. This is particularly a problem when there is a resonance frequency in the process line itself or in superstructures installed therein, such as boilers for example, the resonance frequency is similar to that of the Coriolis mass flow meter. In this case there will occur significant interactions between the device and the environment and the zero point will quickly become unstable. This leads to measuring errors.

In order to increase the zero point stability on prior Coriolis mass flow meters, it is known to use joint plates. These connect the U-shaped measuring tubes in the vicinity of the ends of the leg of the U to each other such that the position of the measuring tubes in relation to each other remains fixed. They serve the task of separating the natural, self-exited vibration of the measuring tubes, as occurs with non-flowing fluid, from the vibration based on Coriolis forces as occurs with flowing fluid and to the task of reducing the transfer of vibration between the measuring tubes and the piping system. Attempted solutions are disclosed in EP 1 166 051 B1, EP 1 985 975 A2, and WO 2009/050133 A1. In each case, two joint plates are provided at each leg end of the U-shaped measuring tubes, and the position of said joint plates is precisely defined. More particularly, in EP 1 985 975 A2 the attempt is made to adapt the arrangement of the joint plates by means of FEM (Finite Element Method) and thus to minimize the vibration amplitude at the process connectors of the device.

EP 1 248 084 A1 discloses a Coriolis mass flow detector comprising two curved measuring tubes that are disposed symmetrically about a plane of symmetry E and oppose each other in a mirror-inverted manner and are caused to oscillate substantially at right angles to said plane of symmetry. The two measuring tubes are disposed such that their sectional planes enclose an angle $\alpha$ of less than $3°$, in order to compensate for forces present in the plane of symmetry E and occurring at the tube ends.

However, it has been found that there is still room for improvement as regards the zero point stability in spite of the solutions already proposed.

SUMMARY OF THE INVENTION

It is thus an object of the present invention to provide an improved Coriolis mass flow meter showing a significantly improved zero point stability. This object is achieved by the features of the invention, and advantageous embodiments of the invention are disclosed below.

When considering the solution to the present problem, the inventors undertook a detailed analysis of the cause or causes of the vibrations that occur. Going back now to the Coriolis mass flow meter illustrated in FIGS. 1A, 1B, 2A, 2B, and 2C, it is seen that a small portion of the curve in the measuring tubes 5 is transferred via the first joint plate 7 and 8 respectively to the lower curved portion of the measuring tubes 5 and leads to small movements of the entire device 1 or to slight bending of the metallic frame 12 or the process connectors. More detailed analysis of the oscillatory deflections of the measuring tubes 5 reveals that the oscillatory deflections for an outward oscillation of the measuring tubes 5, on the one hand, are not perfectly identical to those for an inward oscillation of the measuring tubes 5, on the other hand. In the region of the joint plates 7, 8 occur stretching or buckling as indicated diagrammatically in FIG. 2A by a double-headed arrow. In the first case, i.e. that of outward oscillation, the first joint plate 7, 8 is stretched, and the second joint plate 7', 8', respectively, is compressed. In the case of inward oscillation, the reverse is the case, i.e. the first joint plate 7, 8 is compressed, and the second joint plate 7', 8', respectively, is strained. This state is illustrated in FIG. 2A by way of example.

If the joint plates are thin compared with the measuring tube diameter, there then occurs additional bending of the measuring tube in the region of the lower portion of the arch, i.e. in the region of the end of the U-shaped leg, in each case.

In the case of an outward oscillation of the measuring tube, the lower portion of the arch opens out, and the entire tube loop moves downwardly.

When the two measuring tubes move towards each other, the lower portion of the arch closes, and the entire tube loop moves upwardly.

In FIG. 2A, there is shown a sectional view of the two measuring tubes 5 and 5', wherein in each case different states of movement A and Z are illustrated. The lower regions of the measuring tubes 5, 5' remain comparatively stationary or unmoved during the vibration. The upper regions of thereof, on the other hand, are deflected to a maximum extent, and the height of the central arch, as indicated by the positions of the peaks $S_A$, $S_Z$, $S_{A'}$ and $S_{Z'}$, in the states A and B respectively, varies. In other words, the effect of unequal flexural movement of the lower portion of the arch leads to an overall movement of the pipe loop within one vibration period, which must be compensated for by a counter-movement of the entire housing. The device thus vibrates in its entirety, i.e. including the process connectors, at the resonance frequency, which can lead to the aforementioned zero point instabilities. In FIG. 2B, the aforementioned oscillatory process is again illustrated in a side view for outward oscillations and in FIG. 2C for inward oscillations. The arrows indicate the directions of motion.

The present invention now offers a number of approaches for the removal of the resultant states of zero point instability. Each of these approaches aims at compensating for, or neutralizing, the vibrations such as occur in the region of the process connectors, by the generation of a specific counter-vibration.

According to one exemplary embodiment, a Coriolis mass flow meter comprises a housing comprising an inlet and an outlet for a fluid medium, these being disposed along a flow axis. A fluid medium can, for example, be a gas or a liquid. The housing can be of one or more parts and is more particularly of metal. Furthermore, the Coriolis mass flow meter has a pair of U-shaped measuring tubes, through which the fluid medium flows and which can be disposed between the inlet and the outlet. The measuring tubes have a substantially central arch, which arches are in each case adjoined by leg regions of the U-shaped measuring tube. In the region of their ends, the measuring tubes are curved to such an extent that they can be connected to the stream-splitting device, wherein this connection extends substantially in the direction of the flow axis. The measuring tubes lie in each case on a plane E and are substantially identical.

The Coriolis mass flow meter further comprises at least one joint plate, which connects the two U-shaped measuring tubes in the region of a leg of the U to each other such that their position relative to each other is fixed. The joint plates can be designed in a manner known per se. Furthermore, the Coriolis mass flow meter has a vibration exciter known per se and also comprises two vibration sensors for the detection of the measuring tube movements. This is basically also known in the prior art.

According to the exemplary embodiment, the two U-shaped measuring tubes are not parallel to each other, but are tilted at a predefined angle relatively to each other such that vibration suppression can be achieved in the region of the process connectors of the device. An appropriately adapted inclination of the two measuring tubes relative to each other can perfectly neutralize the overall movement of the tubes occurring during vibration. The overall vibration of the measuring tubes and the damaging compensatory vibration of the entire housing no longer occur. The optimal angle of the measuring tubes relative to each other is dependent on the dimensions of the measuring tubes, their radii of curvature, their thickness and the exact locality of these joint plates and other dimensions of the frame and of the stream-splitting devices, etc. in the measuring devices. According to the invention, the angle is determined prior to assembly or fabrication in accordance with the knowledge of the characteristics of the Coriolis mass flow meter and can be found, for example, with the aid of FEM models and/or calculations. Alternatively, it is possible to ascertain the external vibrations with the aid of a vibration sensor and to draw appropriate conclusions regarding the optimal inclination of the measuring tubes relative to each other.

In order to acquire the orientation of the U-shaped measuring tubes relative to each other in a mathematically more precise manner, it is necessary to refer back to the illustration of the Coriolis mass flow meter as shown in FIGS. 1A and 1B. The U-shaped measuring tubes 5 disposed therein are parallel to each other. This relates to the state in which no vibration excitation occurs. In this case each of the measuring tubes 5 lies substantially in one plane. The two planes, in which the measuring tubes lie or are curved, are parallel to each other. The two measuring tubes are preferably substantially identical, that is to say, they have substantially identical dimensions and masses.

In this exemplary embodiment it is still true that each of the two U-shaped measuring tubes itself lies in one plane. But the two planes in which the U-shaped measuring tubes lie are no longer perfectly parallel to each other, but are instead tilted towards each other. This tilt is deliberate and is not to be confused with non-deliberate inclinations as may possibly occur due to manufacturing tolerances during the fabrication of the measuring devices.

It is preferred that the angle of inclination enclosed by the two U-shaped measuring tubes be typically between 0.2° and 0.4°. The angle of inclination refers to that angle, by which the two planes, in which the two U-shaped measuring tubes in each case lie, deviate from the position in which they are parallel to each other. This is determined or defined in a state with no mass flow and no vibration excitation.

The planes are basically inclined towards each other, i.e. they converge. The difference between deliberate angular positioning and deviations from parallelism of the planes due to natural manufacturing tolerances can, for example, be demonstrated on the basis of an investigation of a relatively large batch of products. Appropriate averaging then reveals whether there is scattering around an angle of inclination of zero degrees, in which case parallelism is present, or whether a different degree of inclination, more particularly slight convergence, is present. Moreover, manufacturing tolerances are smaller than the inclination deliberately chosen according to the invention, namely distinctly less than 0.1°.

According to one exemplary embodiment, the Coriolis mass flow meter comprises two stream-splitting devices disposed upstream and downstream of the two U-shaped measuring tubes, respectively. The provision of two flow splitters in the vicinity of the process connectors or near to the inlet and outlet for the fluid medium is known per se and is also of advantage when used in the Coriolis mass flow meter of the invention. However, it would also be possible to use, instead of the stream-splitting device, an appropriate number of process connectors and to cause the fluid to flow through the respective measuring tube.

According to one exemplary embodiment, the Coriolis mass flow meter comprises a total of four joint plates, wherein in each case two joint plates are provided at each leg end of the U of the U-shaped measuring tubes. The use of a total of four joint plates leads in advance to a substantial suppression of unwanted vibration in the region of the process connectors of the device.

According to the invention, the desired vibration compensation or vibration suppression in the region of the process connectors is not achieved by an inclination of the measuring tubes towards each other. Instead, two alternative approaches are followed:

According to a first aspect, the invention relates to a Coriolis mass flow meter comprising a housing comprising an inlet and an outlet for a fluid medium, which are disposed along a flow axis. The Coriolis mass flow meter furthermore has a pair of U-shaped measuring tubes, through which the fluid medium flows and which can be disposed between the inlet and the outlet. The two measuring tubes are substantially identical and each lies on a plane E. The device has at least one joint plate, which connects the two U-shaped measuring tubes to each other in the region of a leg of the U such that their position relative to each other is fixed. The Coriolis mass flow meter further comprises a vibration exciter and two vibration sensors for detection of the measuring tube movements. Up to this point, that already stated above with regard to the exemplary embodiment substantially holds true.

The characterizing feature of the first solution within the scope of the invention is that the housing comprises, in addition to a core region, which surrounds the flow axis, also an enveloped region, which surrounds the two U-shaped measuring tubes, wherein a connection between the core region and the enveloped region is as rigid as possible such that it is possible to achieve vibration compensation and thus vibration suppression in the region of the process connectors of the device. The core region can then serve as a resilient element, although other parts of the device may also fulfill this purpose. In this way it is possible to achieve vibration suppression in the region of the process connectors of the device. This solution thus aims at compensating for resultant vibrations by a specific construction of the Coriolis mass flow meter such that virtually no further vibration occurs in the region of the inlet and outlet for the fluid medium or in the region of the process connectors. The enveloped region of the housing is rigid and is preferably of metal. The enveloped region is preferably positively locked, e.g. welded, to an upper plate of the core region.

At this juncture, it must be emphasized that according to this first embodiment of the invention the vibration suppression in the region of the process connectors is not alone achieved by the fact that the core region and the enveloped region are rigidly locked to each other. A rigid connection alone does indeed contribute to vibration suppression, but is not intrinsically responsible for compensation. According to the invention, however, compensatory vibrations are actively used to effect vibration suppression.

According to a preferred embodiment of the invention, the housing is formed such that resilience or vibration compensation is produced by an upper plate of the housing.

According to a preferred embodiment of the invention, the thickness of the upper plate of the housing is such that the resonance frequency of the housing lies between 10 Hz and 100 Hz above the highest occurring resonance frequency of the U-shaped measuring tubes.

According to a particularly preferred embodiment of the invention the resonance frequency of the housing lies approximately 50 Hz above the highest occurring resonance frequency of the U-shaped measuring tubes.

According to a second aspect of the invention, the invention relates to a Coriolis mass flow meter comprising a housing comprising an inlet and an outlet for a fluid medium that are disposed along a flow axis. The Coriolis mass flow meter further has a pair of U-shaped measuring tubes, through which the fluid medium flows and which can be disposed between the inlet and the outlet. The two U-shaped measuring tubes lie in each case on a plane E. They are substantially identical. The device has at least one joint plate, which connects the two U-shaped measuring tubes to each other in the region of a leg of the U such that their position relative to each other is fixed. The Coriolis mass flow meter further comprises a vibration exciter and two vibration sensors for detection of the measuring tube movements. Up to this point, that already stated above regarding the exemplary embodiment substantially holds true.

The characterizing feature for the second solution within the scope of the invention is now the fact that the mass distributions of the vibration exciter and/or the two vibration sensors in relation to the planes on which the measuring tubes lie differ from each other. It is thus preferred that the different mass distributions be at identical positions of the vibration exciter and/or the vibration sensors with reference to the respective plane. Thus the positions can be identical for each plane or measuring tube, but the masses differ from each other within the assumed position(s) and thus the mass distributions differ. In the simplest case some additional mass is simply applied to the measuring tube at the position of the vibration exciter and/or the vibration sensor(s).

The second solution is based on the following concept: Basically, vibration occurring at the process connectors is largely independent of the mass of the vibration exciter and the vibration sensors when the masses of the vibration exciter and vibration sensors are symmetrical with reference to the planes in which the measuring tubes lie or when the mass distributions are identical in each plane. If, however, the mass distributions differ in each plane, the unequal mass distributions will produce slight bending of the respective measuring tube, which generally appears as additional vibration at the process connectors. Special configuration of the mass distribution, however, can generate deliberate additional vibration, in order to neutralize other vibrations and thus render them harmless. For example, it is possible to place additional masses on the measuring tubes such that one additional weight does not exactly lie in the plane on which in each case the measuring tube lies. The appropriate choice of the masses can compensate for systematic tube deformations, which lead to an up and down compensating movement of the housing. The mass distributions required for this purpose can be ascertained by model calculations, e.g. by FEM, or they can be determined experimentally.

The various preferred embodiments of the invention can be completely or partially combined with each other. This also applies to combinations of the two different solution approaches, possibly also in combination with the illustrative exemplary embodiment.

BRIEF DESCRIPTION OF THE DRAWINGS

The invention will now be explained in greater detail with reference to the attached figures, which are merely given by way of example and are not intended to restrict the invention. In the schematic drawings:

FIGS. 2A, 2B, and 2C illustrate diagrammatically the resulting bends formed in the lower portion of the measuring tubes and the accompanying overall movement of the pipe loop in Coriolis mass flow meters according to the prior art;

FIGS. 4A and 4B show a perspective view and a diagrammatic side view, respectively, of a Coriolis mass flow meter of the invention comprising a special housing for achieving vibration suppression;

FIG. 5 illustrates the vibration suppression obtained with a Coriolis mass flow meter of the invention comprising the housing shown in FIGS. 4A and 4B.

DETAILED DESCRIPTION OF PREFERRED EMBODIMENTS

Figure 1A:
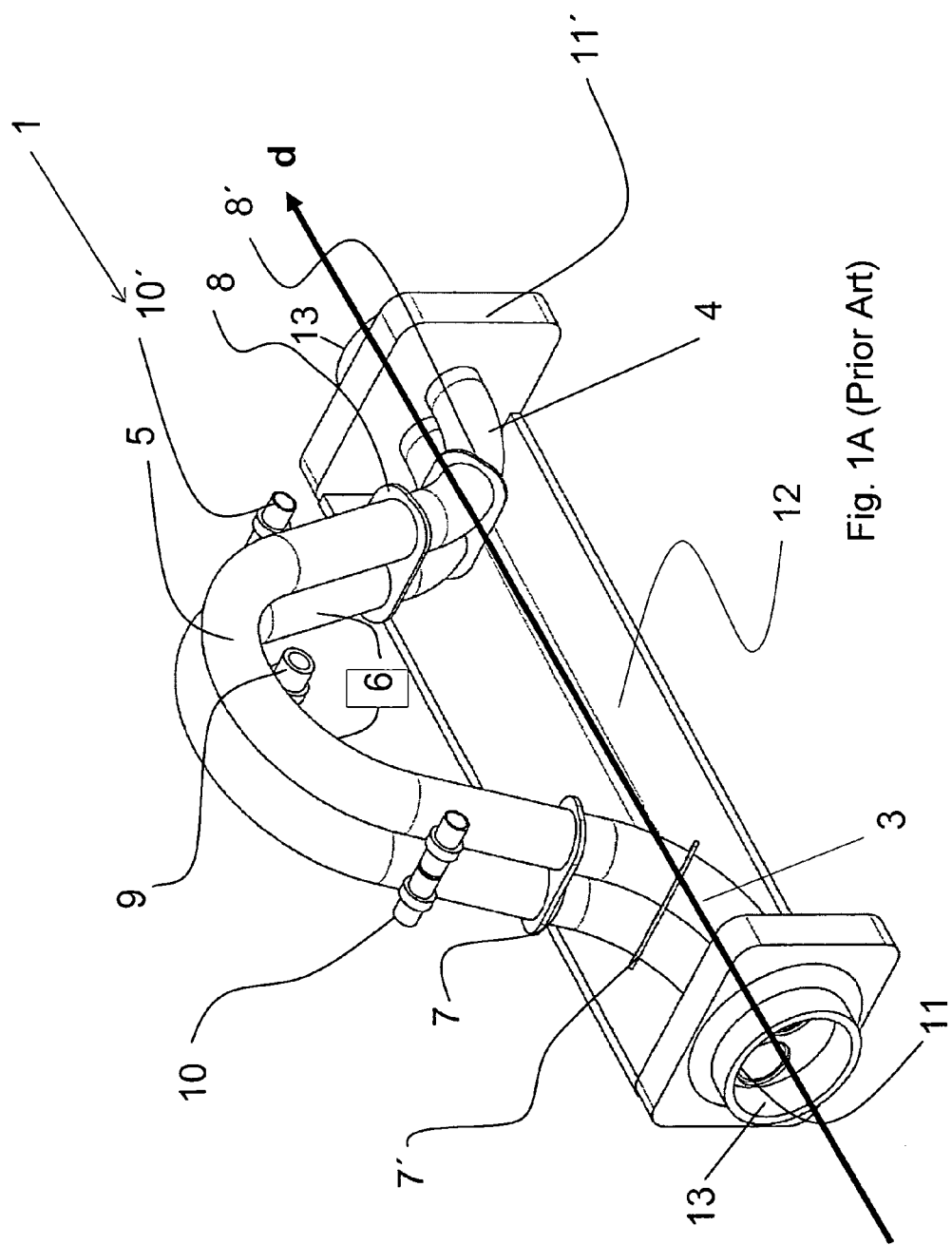
FIGS. 1A and FIG. 1B show a perspective view and a diagrammatic side view, respectively, of a Coriolis mass flow meter according to the prior art.
Figure 1B:
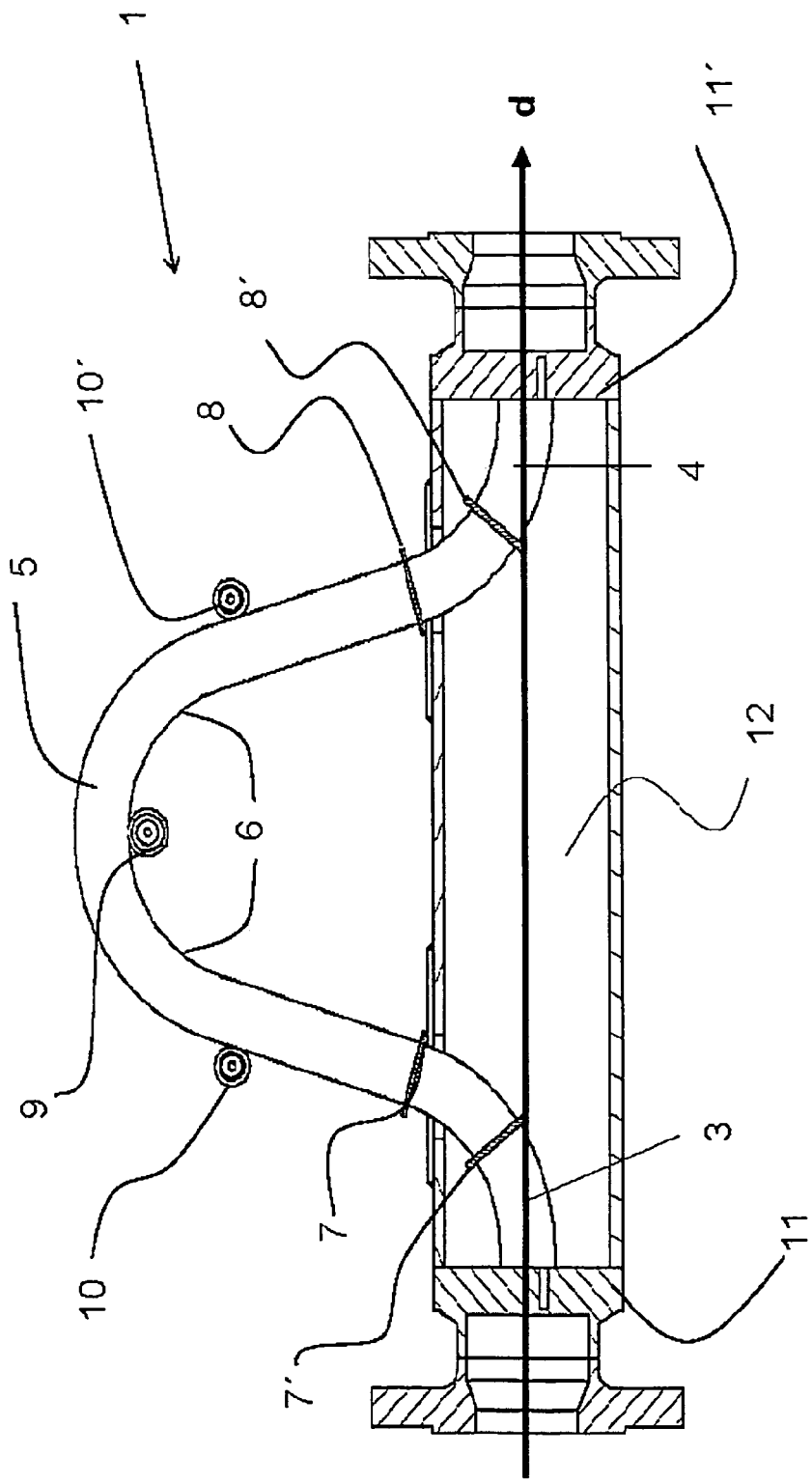
Figure 3:
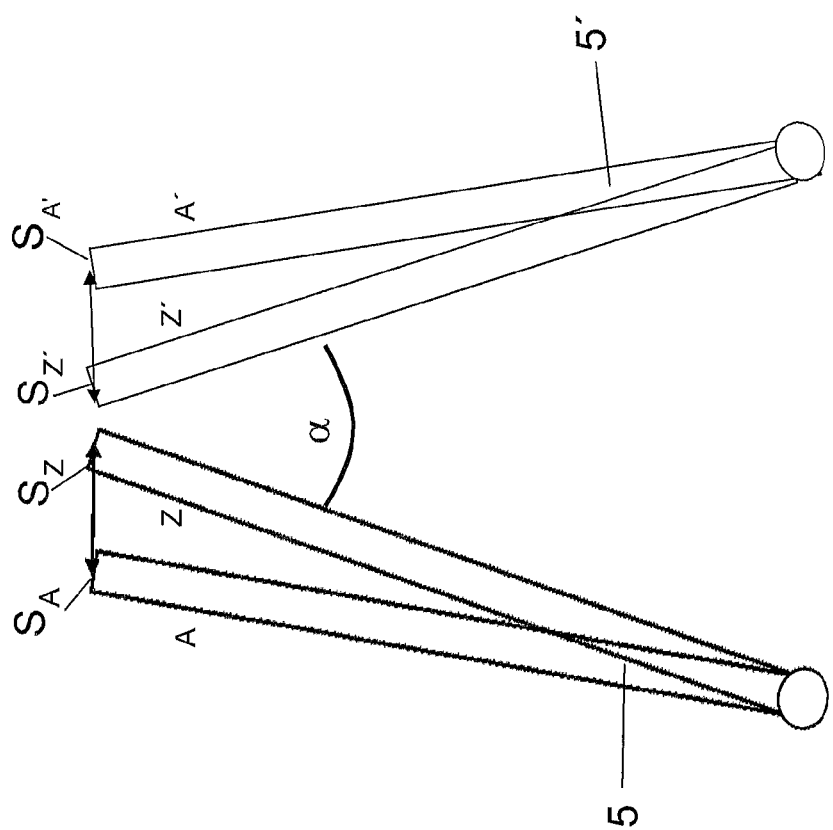
FIG. 3 illustrates the inclination of the U-shaped measuring tubes and the resultant effect of vibration suppression.

FIG. 3 illustrates vibration suppression obtained in the region of the process connectors of a Coriolis mass flow meter on the basis of the predefined inclination of the two U-shaped measuring tubes 5 relative to each other. FIG. 3 shows diagrammatically in the same drawing the position of the measuring tubes 5 and 5' respectively in the case of an outward oscillation (A), and in the case of an inward oscillation (Z) of the two U-shaped measuring tubes 5 and 5' respectively. Here again, in the case of an outward oscillation, the lower portion of the arch of the measuring tubes opens and the entire pipe loop moves downwardly. Correspondingly, in the case of an inward oscillation, the lower portions of the arch move towards each other and the entire pipe loop moves upwardly or stretches. This difference in length or difference in expansion, however, now results no longer at different levels of the peak S of the U-shaped measuring tubes, but instead the position of the peak $S_A$, $S_Z$ and $S_Z$, $S_{A'}$ is always at the same level. This is indicated in FIG. 3 by the horizontal double-headed arrows.

The two U-shaped measuring tubes 5 and 5' respectively are inclined towards each other by an angle α. Of course, this angle of inclination α changes during vibrational movements. The reference value is always taken to be that angle of inclination α which is measured without additional vibration excitation of the U-shaped measuring tubes 5 and 5' respectively. Typically, the angle α lies in the idle state between 0.2° and 0.4°.

Figure 4A:
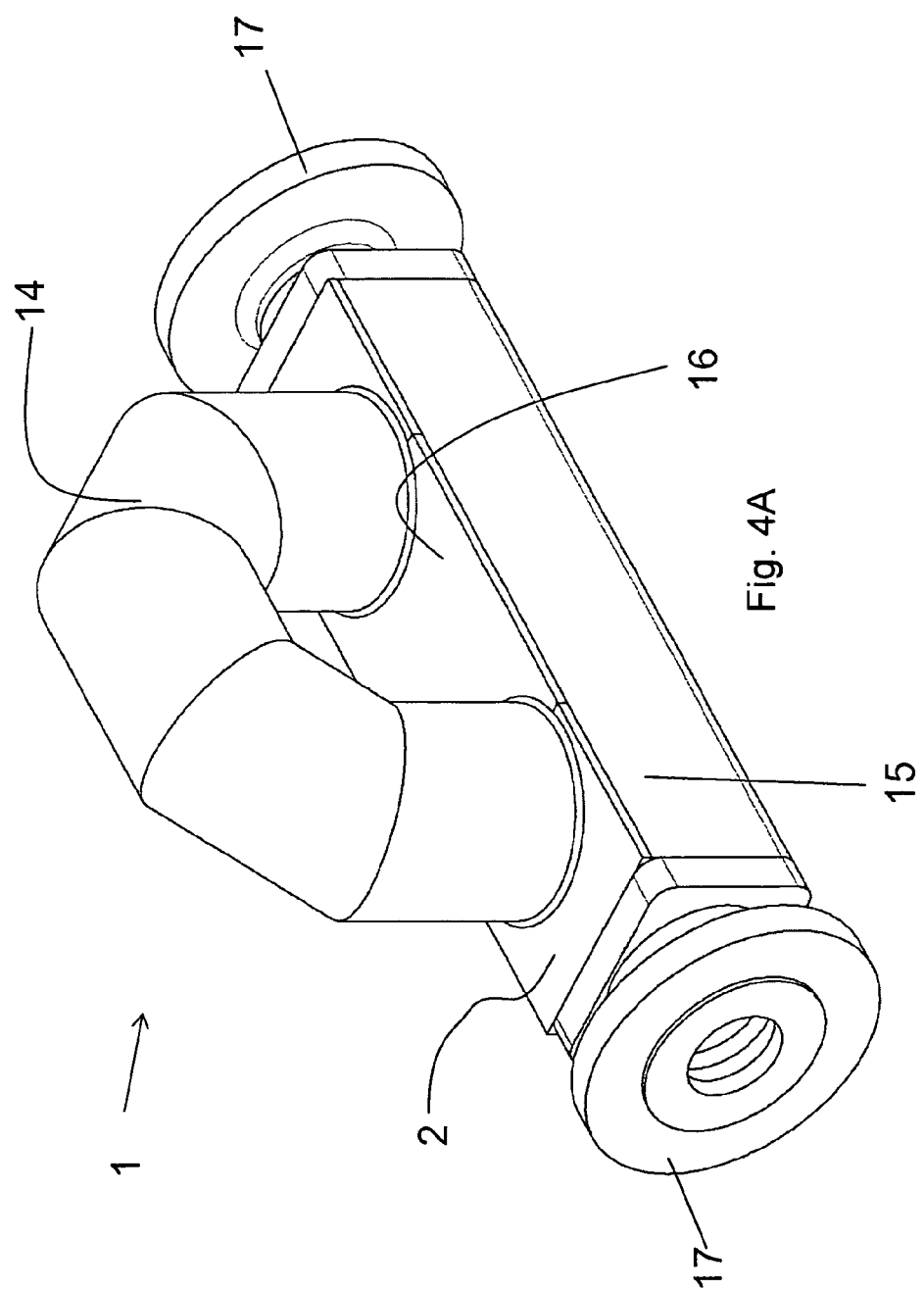

FIGS. 4A and 4B show a Coriolis mass flow meter 1 of the invention comprising a special housing for the reduction of vibration in the region of the process connectors. FIG. 4A shows a perspective view, and FIG. 4B shows a diagrammatic side view. There is shown a substantially cuboid-shaped housing or a core region 15, which surrounds or envelops the flow axis through the measuring device. In the vicinity of this housing region 2 there are typically located the inlet and outlet and also a stream-splitting device in the region of the inlet and a stream-splitting device in the region of the outlet. FIGS. 4A and 4B show the enveloped region 14, which is enveloped by the two U-shaped measuring tubes 5 and which is rigidly attached to the core region 15. The enveloped region can, for example, be of metal. In the present exemplary embodiment, the enveloped region 14 is locked positively, e.g. welded, to an upper plate 16 of the housing 2. The thickness of the upper plate 16 is such that the resonance frequency of the housing with the upper plate acting as a resilient element lies approximately 10 Hz above the highest resonance frequency of the enveloped measuring tubes. If such a construction is used, the hood will oscillate as counter-vibrator, in the case of a dissimilarity of the measuring tubes, against the paired motion of the tubes. The process connectors 17 remain very much calmer than if the housing or the enveloped region 14 were rigidly connected via the upper plate 16 to the flow splitters.

FIG. 5 illustrates the vibration-suppressing effect when use is made of the device shown in FIGS. 4A and 4B. For the purposes of illustration, one measuring tube was equipped with a weight in the vicinity of the exciter to render the measuring tube dissimilar to the other measuring tube, which would of course normally lead to significant vibration in the region of the process connectors if the housing of the invention were not used. In the present example, the resonance frequency of the housing with the upper plate acting as resilient element lies approximately 50 Hz above the tube resonance frequency. Under considerable scale-up of this effect, it is seen, as diagrammatically illustrated in FIG. 5, that the housing oscillates about an axis slightly above the flow axis as indicated by the double-headed arrow and that the process connector executes no visible rotary movements. The oscillation of the housing thus compensates for active vibration in the region of the process connectors.

Figure 6:
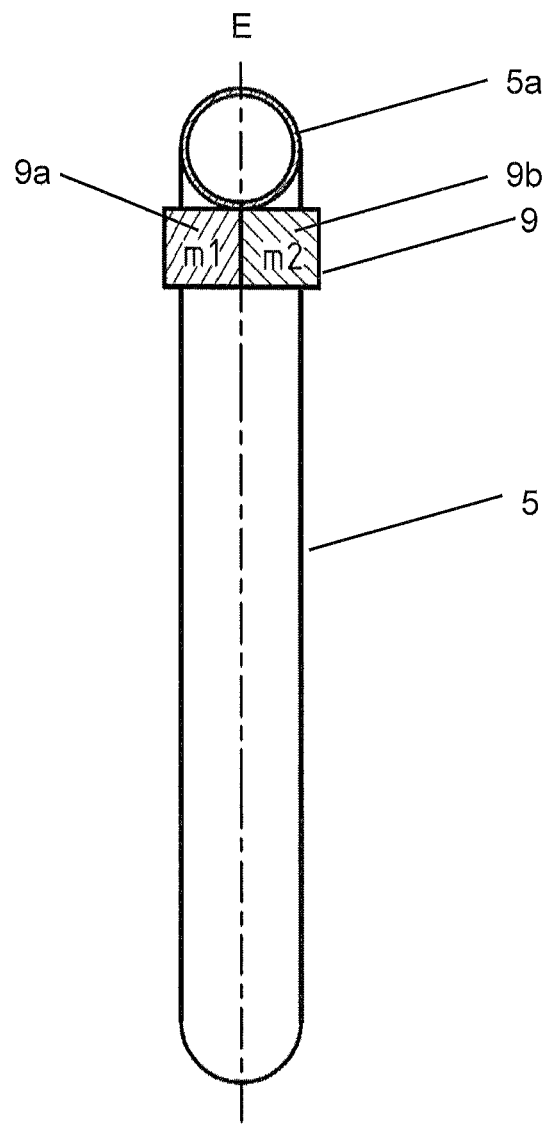
FIG. 6 is a sectional view illustrating vibration suppression based on an asymmetric mass distribution.

FIG. 6 illustrates another preferred embodiment of the present invention which is based on the excitation of specific counter-vibrations due to an asymmetric mass distribution. It shows a cut-out of a Coriolis mass flow meter 1 and depicts one of the two U-shaped flow tubes 5 and the respective plane E lying in the geometric center of the flow tube 5. At the top 5a of the U-shaped flow tube 5, there is provided an exciter 9 which has a specific mass distribution that leads to the excitation of specific counter-vibrations in the region of the connections of the mass flow meter in order to neutralize and therefore actively suppress vibrations in the region of the connections of the device 1.

In the specific example shown in FIG. 6, the exciter 9 has an asymmetric mass distribution with respect to the plane E. The entire exciter 9 comprises two parts or regions 9a and 9b, each lying on a specific side with respect to the central symmetry plane E. In the present case, the dimensions of the two parts 9a and 9b are identical. However, the respective masses m1 and m2 differ from one another. Therefore, the mass distribution of the exciter 9 is asymmetric with respect to the plane E. Of course, there exist other possibilities for providing such an asymmetric mass distribution, including for example different dimensions or/and shapes of the exciter parts 9a and 9b, but identical densities etc. The key aspect is the provision of a specific asymmetric mass distribution in order to specifically excite counter vibrations for neutralizing unwanted vibrations in the region of the connections of the device.

As mentioned above, in the specific example of FIG. 6, the asymmetric mass distribution is realized by providing a specific exciter 9 having an asymmetric mass distribution. This example is a very comfortable realization of the invention because its simple structure facilitates calculations/predictions of counter vibrations to be excited. However, alternatively or additionally, it is of course possible that other parts of the mass flow meter have a specific asymmetry for exciting counter vibrations. One possibility is, for example, to provide the detector or detectors 10 with an asymmetric mass distribution with respect to the plane E.

The invention thus makes it possible to provide a Coriolis mass flow meter that has an improved zero point stability. This is achievable, on the one hand, by the use of a special housing for the Coriolis mass flow meter for active vibration compensation and, on the other hand, by causing active vibration on the basis of specific mass distribution on the vibration exciter and/or the vibration sensors for neutralization of unwanted vibrations.

What is claimed is:

1. A Coriolis mass flow meter, which comprises:
    a housing comprising an inlet and an outlet for a fluid medium, which are disposed along a flow axis;
    first and second U-shaped measuring tubes disposed between said inlet and said outlet, through which the fluid medium can flow, wherein said first measuring tube lies on a first plane and has a first peak at a first level and said second measuring tube lies on a second plane and has a second peak at a second level;
    at least one joint plate, which connects the first and second U-shaped measuring tubes to each other in the region of a leg of the U such that their position relative to each other is fixed;
    a vibration exciter having a first mass distribution in relation to the first plane and a second mass distribution in relation to the second plane; and
    first and second vibration sensors for the detection of the measuring tube movements, wherein the first vibration sensor has a third mass distribution in relation to the first plane and the second vibration sensor has a fourth mass distribution in relation to the second plane;
    wherein at least one of the first, second, third, and fourth mass distributions is asymmetric with respect to the respective plane, such that vibration suppression can be achieved in the region of process connectors of said Coriolis mass flow meter and such that the first level remains equal to the second level during operation of the vibration exciter.

* * * * *